(12) United States Patent
Gordon et al.

(10) Patent No.: US 7,807,012 B2
(45) Date of Patent: Oct. 5, 2010

(54) MOLDABLE COMPOSITIONS CONTAINING CARBINOL FUNCTIONAL SILICONE RESINS OR ANHYDRIDE FUNCTIONAL SILICONE RESINS

(75) Inventors: Glenn Viaplana Gordon, Midland, MI (US); Randall Gene Schmidt, Midland, MI (US); Gary Michael Wieber, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 756 days.

(21) Appl. No.: 11/665,576

(22) PCT Filed: Oct. 20, 2005

(86) PCT No.: PCT/US2005/037963

§ 371 (c)(1),
(2), (4) Date: Apr. 16, 2007

(87) PCT Pub. No.: WO2006/047318

PCT Pub. Date: May 4, 2006

(65) Prior Publication Data

US 2008/0105375 A1    May 8, 2008

Related U.S. Application Data

(60) Provisional application No. 60/621,780, filed on Oct. 25, 2004.

(51) Int. Cl.
  B29C 67/00      (2006.01)
  C09J 5/06       (2006.01)
  C04B 37/00      (2006.01)
  C08F 283/12     (2006.01)
  C08G 77/00      (2006.01)
  C08G 77/38      (2006.01)
  C08L 83/00      (2006.01)

(52) U.S. Cl. .................. 156/325; 156/321; 525/474
(58) Field of Classification Search .............. 156/321, 156/325; 525/474
  See application file for complete search history.

(56) References Cited

U.S. PATENT DOCUMENTS

| | | | |
|---|---|---|---|
| 3,419,593 A | 12/1968 | Willing | |
| 3,475,513 A * | 10/1969 | Benson | 525/396 |
| 3,715,334 A | 2/1973 | Karstedt | |
| 3,814,730 A | 6/1974 | Karstedt | |
| 3,839,280 A | 10/1974 | Zdaniewski | |
| 3,923,705 A | 12/1975 | Smith | |
| 4,125,510 A | 11/1978 | Antonen | |
| 4,157,357 A | 6/1979 | Mine et al. | |
| 4,202,807 A | 5/1980 | Moretto et al. | |
| 4,234,697 A | 11/1980 | Homan et al. | |
| 4,657,986 A | 4/1987 | Isayama et al. | |
| 4,722,951 A | 2/1988 | Yoshioka et al. | |
| 4,732,790 A * | 3/1988 | Blackburn et al. | 427/407.1 |
| 4,795,680 A | 1/1989 | Rich et al. | |
| 4,877,822 A | 10/1989 | Itoh et al. | |
| 4,977,199 A | 12/1990 | Koleske et al. | |
| 5,013,577 A | 5/1991 | Wright et al. | |
| 5,015,700 A | 5/1991 | Herzig et al. | |
| 5,102,960 A | 4/1992 | Imai et al. | |
| 5,117,001 A | 5/1992 | Okinoshima et al. | |
| 5,126,126 A | 6/1992 | Varaprath et al. | |
| 5,135,993 A | 8/1992 | Decker et al. | |
| 5,152,984 A | 10/1992 | Varaprath et al. | |
| 5,175,325 A | 12/1992 | Brown et al. | |
| 5,262,507 A | 11/1993 | Decker et al. | |
| 5,283,279 A | 2/1994 | Hara et al. | |
| 5,290,882 A | 3/1994 | Shiobara et al. | |
| 5,290,901 A | 3/1994 | Burns et al. | |
| 5,362,821 A | 11/1994 | Decker et al. | |
| 5,378,532 A | 1/1995 | Decker et al. | |
| 5,405,688 A | 4/1995 | Decker et al. | |
| 5,431,765 A | 7/1995 | Decker et al. | |
| 5,516,858 A | 5/1996 | Morita et al. | |
| 5,814,679 A | 9/1998 | Eckberg et al. | |
| 5,840,806 A | 11/1998 | Komazaki et al. | |
| 5,891,969 A | 4/1999 | Mine et al. | |
| 5,939,491 A | 8/1999 | Wilt et al. | |
| 5,952,439 A | 9/1999 | Morita et al. | |
| 6,040,394 A | 3/2000 | Wilt et al. | |

(Continued)

FOREIGN PATENT DOCUMENTS

DE     3803088     8/1988

(Continued)

OTHER PUBLICATIONS

U.S. Appl. No. 60/614,249, filed Sep. 29, 2004, Gordon et al.

(Continued)

*Primary Examiner*—Philip C Tucker
*Assistant Examiner*—Michael N Orlando
(74) *Attorney, Agent, or Firm*—Patricia M. Scaduto

(57) ABSTRACT

Thermal curable compositions contains a glycidyl ether epoxide resin, a carbinol functional silicone resin or an anhydride functional silicone resin, and a thermal catalyst. An organic polyol, an organic anhydride, and filler, are optional components that may also be included in the composition. The glycidyl ether epoxide resin adds toughness and adhesion to the composition, whereas the carbinol functional silicone resin and the anhydride functional silicone resin provide water resistance, weatherability, thermal stability, and flexibility.

20 Claims, No Drawings

U.S. PATENT DOCUMENTS

| | | | |
|---|---|---|---|
| 6,046,276 | A | 4/2000 | Ambrose et al. |
| 6,046,296 | A | 4/2000 | Wilt et al. |
| 6,048,934 | A | 4/2000 | Wilt et al. |
| 6,071,990 | A | 6/2000 | Yip et al. |
| 6,103,824 | A | 8/2000 | Wilt et al. |
| 6,103,838 | A | 8/2000 | Wilt et al. |
| 6,136,928 | A | 10/2000 | Wilt et al. |
| 6,187,863 | B1 | 2/2001 | Wilt et al. |
| 6,475,628 | B2 | 11/2002 | Hase et al. |
| 6,506,869 | B2 | 1/2003 | Yamaguchi et al. |
| 6,579,914 | B1 | 6/2003 | Gantt et al. |
| 6,646,102 | B2 | 11/2003 | Boriack et al. |
| 6,800,373 | B2 | 10/2004 | Gorczyca |

FOREIGN PATENT DOCUMENTS

| | | | |
|---|---|---|---|
| EP | 415204 | | 3/1991 |
| EP | 0511670 | * | 4/1992 |
| GB | 1299575 | | 12/1972 |
| GB | 1470058 | | 4/1977 |
| JP | 03079624 | | 4/1991 |
| JP | 05339279 | | 12/1993 |
| JP | 06157551 | | 6/1994 |

OTHER PUBLICATIONS

U.S. Appl. No. 60/621,740, filed Oct. 25, 2004, Gordon et al.

* cited by examiner

MOLDABLE COMPOSITIONS CONTAINING CARBINOL FUNCTIONAL SILICONE RESINS OR ANHYDRIDE FUNCTIONAL SILICONE RESINS

CROSS-REFERENCE TO RELATED APPLICATIONS

This application is a U.S. national stage filing under 35 U.S.C. §371 of PCT Application No. PCT/US2005/037963 filed on 20 Oct. 2005, currently pending, which claims the benefit of U.S. Provisional Patent Application No. 60/621,780 filed 25 Oct. 2004 under 35 U.S.C. §119 (e). PCT Application No. PCT/US2005/037963 and U.S. Provisional Patent Application No. 60/621,780 are hereby incorporated by reference.

DESCRIPTION

This invention relates to thermal curable compositions containing a glycidyl ether epoxide resin or its hydrogenated forms, a carbinol functional silicone resin, an anhydride functional silicone resin, or a mixture thereof, and optionally, a thermal catalyst. These compositions can be prepared as one-part systems that are in a solid form near the gel point, with all of the components present, to form fully cured compositions once heat is applied. When heat is applied, the compositions exhibit some flow and then cure. As such, the compositions can be delivered in a variety of forms, such as pellets or transfer films, for ease of use in molding operations or thin film adhesive applications.

Epoxy silicones in combination with carbinol functional silicone resins are known in the art. For example, U.S. Pat. No. 5,814,679 (Sep. 29, 1998) discloses blends of photo-curable compositions containing epoxy functionalized silicones and long chain non-resinous silicones containing carbinol functionality. The '679 patent indicates that the long chain non-resinous carbinol containing silicones copolymerize or co-cure with the epoxy functionalized silicones thereby permitting the formulation of premium release photo-curable silicone compositions.

Some types of silicone resins in combination with epoxy resins are known in the art. For example, U.S. Pat. No. 5,135,993 (Aug. 4, 1992) describes a blend of (A) a curable epoxy resin, and (B) an amino functional silicone resin containing units such as (i) $PhSiO_{3/2}$, (ii) $R_2SiO$, and (iii) an aminofunctional siloxy unit such as (a) $H_2NR'SiO_{3/2}$, (b) $R''HNR''SiO_{3/2}$, (c) $(R''HNR'')_{3-y}(R')_ySiO_{1/2}$, and (d) $(H_2NR'')_{3-x}(R')_xSiO_{1/2}$.

In contrast, this invention relates to a moldable composition comprising a glycidyl ether epoxide resin or its hydrogenated forms, a carbinol functional silicone resin, an anhydride functional silicone resin, or a mixture thereof, and optionally, a thermal catalyst. Preferably, the ratio of carbinol and anhydride groups to epoxide groups is 0.5 to 1.2.

Further, this invention relates to a moldable composition containing: (a) 100 parts by weight of a glycidyl ether epoxide resin that is free of silicon atoms; and (b) 50-300 parts by weight of a carbinol functional silicone resin containing the units:
$(R^1_3SiO_{1/2})_a$
$(R^2_2SiO_{2/2})_b$
$(R^3SiO_{3/2})_c$ and
$(SiO_{4/2})_d$.

In the formulae, $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms. $R^3$ is an alkyl group having 1-8 carbon atoms or an aryl group, a has a value of less than or equal to 0.5, b has a value of less than or equal to 0.3, c has a value of 0.3-0.8, d has a value of less than 0.5, and the value of a+b+c+d=1.

There is on average at least one carbinol group per carbinol functional silicone resin molecule. Preferably, the $R^1+R^2+R^3$ groups in the carbinol functional silicone resin component (b) contain a high enough content of phenyl to provide the appropriate compatibility of component (b) with component (a). Preferably, greater than 10 percent by weight of the $R^1+R^2+R^3$ groups are phenyl groups, more preferably, greater than 25 percent by weight. Thermal curable compositions containing the glycidyl ether epoxide resin, and the carbinol functional silicone resin, may also contain (c) 0-10 parts by weight, preferably 0.010-10 parts by weight, more preferably 0.1-5 parts by weight, of a thermal catalyst, and (d) 0-200 parts by weight, preferably 0.1-200 parts by weight, more preferably 50-150 parts by weight of an organic polyol.

This invention also relates to a coating composition containing: (a) 100 parts by weight of a glycidyl ether epoxide resin that is free of silicon atoms; and (b) 50-300 parts by weight of an anhydride functional silicone resin containing units of the formulae:
(i) $(R^4_3SiO_{1/2})_e$
(ii) $(R^5_2SiO_{2/2})_f$
(iii) $(R^6SiO_{3/2})_g$ and
(iv) $(SiO_{4/2})_h$.

In the formulae (i)-(iv), $R^4$, $R^5$, and $R^6$ can each independently represent an anhydride group, a hydrogen atom, an alkyl group having 1-8 carbon atoms, an aryl group, an aralkyl group, or an alkaryl group. The value of e is 0.1-0.6. The value of f is 0-0.3. The value of g is 0.3-0.8. The value of h is 0-0.3. Preferably, e is 0.2-0.4, f is 0-0.2, g is 0.5-0.8, and h is 0. The sum of e, f, g, and h is one. The composition of an average resin molecule contains more than two anhydride groups. Thermal curable compositions containing the glycidyl ether epoxide resin, and the anhydride functional silicone resin, may also contain (c) 0-10 parts by weight, preferably 0.010-10 parts by weight, more preferably 0.1-5 parts by weight, of a thermal catalyst, and (d) 0-200 parts by weight, preferably 0.1-200 parts by weight, more preferably 50-150 parts by weight of an organic anhydride.

The Glycidyl Ether Epoxide Resin

Component (a), the glycidyl ether epoxide resins used herein, are resins that are free of silicon atoms. Such resins are known compositions, and are shown, for example, in U.S. Pat. No. 4,977,199 (Dec. 11, 1990). In Columns 9-10 of the '199 patent, numerous resinous suitable compositions are described in detail. The '199 patent is incorporated herein by reference. U.S. Pat. No. 6,579,914 (Jun. 17, 2003) in Columns 4 and 5, and U.S. Pat. No. 6,646,102 (Nov. 11, 2003) in Columns 24-27, both describe numerous additional resinous compositions that are suitable for use herein. The '914 and '102 patents are also incorporated herein by reference.

Generally, these resins comprise diglycidyl ethers of bisphenol A that are derived from reacting bisphenol A with epichlorohydrin; glycidyl ethers of bisphenol A that are derived from reacting bisphenol A with an alcohol such as n-butyl alcohol and epichlorohydrin; aryl glycidyl ether epoxide resins; polynuclear phenol glycidyl ether epoxide resins; aryl glycidyl ether epoxide resins; di-nuclear aryl glycidyl ether epoxide resins; multi-nuclear aryl glycidyl ether epoxide resins; cresol-novolac glycidyl ether epoxide resins;

and phenol-novolac glycidyl ether epoxide resins and hydrogenated forms of the aryl containing epoxies.

Some representative examples of suitable glycidyl ether epoxide resins that can be used include 2-methylphenol glycidyl ether; 4-methylphenol glycidyl ether; 4-methoxyphenol glycidyl ether; 2,6-dimethylphenol glycidyl ether; 2,6-diisopropylphenol glycidyl ether; 2,6-dibromophenol glycidyl ether; 1,2-, 1,3- and 1,4-dihydroxybenzene diglycidyl ethers; 1,4-, 1,5- and 2,6-dihydroxynaphthalene diglycidyl ethers; 4,4'-(3,3',5,5'-tetramethyl)bisphenol A diglycidyl ether; 4,4'-(3,3',5,5'-tetramethyl-2,2',6,6'-tetrabromo)bisphenol A diglycidyl ether; 4,4'-(3,3',5,5'-tetramethyl)bisphenol F diglycidyl ether; 4,4'-(3,3',5,5'-tetramethyl)bisphenol diglycidyl ether; 4,4'-biphenol diglycidyl ether; 4,4'-(3,3',5,5'-tetramethyl-2,2',6,6'-tetrabromo)bisphenol diglycidyl ether; 4,4'-bisphenol F diglycidyl ether; 4,4'-bisphenol sulfone diglycidyl ether; 4,4'-(3,3',5,5'-tetrabromo)bisphenol A diglycidyl ether; 4,4'-bisphenol A diglycidyl ether; 4,4'-bisphenol K diglycidyl ether; 9,9-bis(4-hydroxyphenyl)fluorine diglycidyl ether; 1,3-bis(4-hydroxyphenyl)adamantane diglycidyl ether; phenol-formaldehyde novolac glycidyl ether; o-cresol-formaldehyde novolac glycidyl ether; phenol-dicyclopentadienyl novolac glycidyl ether; naphthol-formaldehyde novolac glycidyl ether; tris-phenol methane tri-glycidyl ether; tris(3,5-dimethyl-4-hydroxyphenyl)methane tri-glycidyl ether; and 1,1,2,2-tetra-phenol ethane tetra-glycidyl ether.

One example of a preferred commercial product of the glycidyl ether epoxide resin that can be used herein is D.E.R.® 331 Epoxy Resin. It is a product of The Dow Chemical Company, Midland, Mich. This composition is the reaction product of epichlorohydrin and bisphenol-A. It has an epoxy equivalent weight of 182-192 g/eq, an epoxide percentage of 22.4-23.6 percent, and a viscosity of 11,000-14,000 mPa·S. Another preferred commercial product is Eponex® 1510 hydrogenated epoxy resin. It is a product of Resolution Performance Products Houston, Tex. Eponex® 1510 has an epoxy equivalent weight of 210-220 g/eq.

The Carbinol Functional Silicone Resin

The carbinol functional silicone resin of component (b) contains the units:
$(R^1_3SiO_{1/2})_a$
$(R^2_2SiO_{2/2})_b$
$(R^3SiO_{3/2})_c$ and
$(SiO_{4/2})_d$.

In the formulae, $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms. $R^3$ is an alkyl group having 1-8 carbon atoms or an aryl group, a has a value of less than or equal to 0.5, b has a value of less than or equal to 0.3, c has a value of 0.3-0.8, d has a value of less than 0.5, and the value of a+b+c+d=1. There is on average at least one carbinol group per carbinol functional silicone resin molecule. Preferably, the $R^1+R^2+R^3$ groups in the carbinol functional silicone resin component (b) contain a high enough content of phenyl to provide the appropriate compatibility of component (b) with component (a). Preferably, greater than 10 percent by weight of the $R^1+R^2+R^3$ groups are phenyl groups, more preferably, greater than 25 percent by weight.

As used herein, the phrase carbinol group is considered as being any group containing at least one carbon-bonded hydroxyl (COH) group. The carbinol group may contain more than one COH group, such as for example:

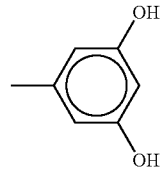

The alkyl groups in the carbinol functional silicone resin are illustrated by methyl, ethyl, propyl, butyl, pentyl, hexyl, and octyl, with the alkyl group typically being methyl. The aryl groups are illustrated by phenyl, naphthyl, benzyl, tolyl, xylyl, xenyl, methylphenyl, 2-phenylethyl, 2-phenyl-2-methylethyl, chlorophenyl, bromophenyl and fluorophenyl, with the aryl group typically being phenyl.

A carbinol group having at least 3 carbon atoms and being free of aryl groups is illustrated by the group $R^7OH$, where $R^7$ is a divalent hydrocarbon group having at least 3 carbon atoms, or a divalent hydrocarbonoxy group having at least 3 carbon atoms. $R^7$ is illustrated by alkylene groups such as $—(CH_2)_m—$ where m is 3-10, $—CH_2CH(CH_3)—$, $—CH_2CH(CH_3)CH_2—$, $—CH_2CH_2CH(CH_2CH_3)CH_2CH_2CH_2—$, and $—OCH(CH_3)(CH_2)_m$, where m is 1-10. The carbinol group having at least 3 carbon atoms and being free of aryl groups is also illustrated by the group $R^8(OH)CH_2OH$, where $R^8$ is the group $—CH_2CH_2(CH_2)mOCH_2CH—$ where m is 1-10.

An aryl containing carbinol group having at least 6 carbon atoms is illustrated by $R^9OH$, where $R^9$ is an arylene group such as $—(CH_2)_nC_6H_4—$, where n is 0-10, $—CH_2CH(CH_3)(CH_2)_nC_6H_4—$, where n is 0-10, and $—(CH_2)_nC_6H_4(CH_2)_n—$, where n is 1-10. The aryl-containing carbinol group typically has 6-14 atoms.

In the carbinol functional silicone resin according to the invention, a has a value of less than or equal to 0.5, preferably 0.2-0.4; b has a value of less than or equal to 0.3, preferably 0-0.2; c has a value of 0.3-0.8, preferably 0.4-0.8, d has a value of less than 0.5, preferably 0-0.1, and the value of a+b+c+d=1. When each $R^2$ group is a methyl group, the value of b is preferably less than 0.1. Carbinol functional silicone resins according to the invention have on average at least one carbinol group per carbinol functional silicone resin molecule. Preferably, the equivalent weight of carbinol groups per carbinol functional silicone resin is 100-1,000, more preferably 200-800.

Some suitable carbinol functional silicone resins are represented by the following compositions:

I. A carbinol functional silicone resin containing the units:
$((CH_3)_3SiO_{1/2})_a$
$((R^2)CH_3SiO_{2/2})_b$ where $R^2$ is $—(CH_2)_3C_6H_4OH$
$((C_6H_5)CH_3SiO_{2/2})_b$ and
$(C_6H_5SiO_{3/2})_c$, II. A carbinol functional silicone resin containing the units:
$((R^1)(CH_3)_2SiO_{1/2})_a$ where $R^1$ is $(CH_2)_3C_6H_4OH$ and
$(C_6H_5SiO_{3/2})_c$, III. A carbinol functional silicone resin containing the units:
$((R^1)(CH_3)_2SiO_{1/2})_a$ where $R^1$ is $—(CH_2)_3OH$ and
$(C_6H_5SiO_{3/2})_c$, IV. A carbinol functional silicone resin containing the units:
$((R^1)(CH_3)_2SiO_{1/2})_a$ where $R^1$ is $—(CH_2)_3OH$
$(CH_3SiO_{3/2})_c$ and
$(C_6H_5SiO_{3/2})_c$, V. A carbinol functional silicone resin containing the units:
$((CH_3)_3SiO_{1/2})_a$
$((R^2)CH_3SiO_{2/2})_b$ where $R^2$ is —$(CH_2)_3OH$
$((C_6H_5)CH_3SiO_{2/2})_b$ and
$(C_6H_5SiO_{3/2})_c$, VI. A carbinol functional silicone resin containing the units:
$((CH_3)_3SiO_{1/2})_a$
$((R^1)(CH_3)_2SiO_{1/2})_a$ where $R^2$ is —$(CH_2)_3OH$ and
$(C_6H_5SiO_{3/2})_c$, and VII. A carbinol functional silicone resin containing the units:
$((R^1)(CH_3)_2SiO_{1/2})_a$ where $R^2$ is —$CH_2CH(CH_3)CH_2OH$
$((H)(CH_3)_2SiO_{1/2})_a$ and
$(C_6H_5SiO_{3/2})_c$.

In formulae I-VII, a has a total value in the resin of 0.2-0.4, b has a total value in the resin of 0-0.3, and c has a total value in the resin of 0.3-0.8.

Carbinol functional silicone resins can be prepared by reacting:
(A) at least one hydrogen functional silicone resin containing units of the formulae:
$(R^{10}_3SiO_{1/2})_a$
$(R^{11}_2SiO_{2/2})_b$
$(R^3SiO_{3/2})_c$ and
$(SiO_{4/2})_d$, with
(B) at least one vinyl terminated alcohol; in the presence of
(C) a hydrosilylation catalyst; and optionally
(D) at least one solvent.

In the formulae, $R^{10}$ and $R^{11}$ are each independently an alkyl group having 1-8 carbon atoms, an aryl group, or a hydrogen atom; $R^3$ is an alkyl group having 1-8 carbon atoms or an aryl group; a is less than or equal to 0.6; b is less than or equal to 0.3, c is 0.3-0.8, d is less than 0.5; the sum of a+b+c+d=1; and provided there are at least two silicon-bonded hydrogen atoms present in the silicone resin.

The Anhydride Functional Silicone Resin

The anhydride functional silicone resin (b) contains units of the formulae:
(i) $(R^4_3SiO_{1/2})_e$
(ii) $(R^5_2SiO_{2/2})_f$
(iii) $(R^6SiO_{3/2})_g$ and
(iv) $(SiO_{4/2})_h$.

In the formulae (i)-(iv), $R^4$, $R^5$, and $R^6$ can each independently represent an anhydride group, a hydrogen atom, an alkyl group having 1-8 carbon atoms, an aryl group, an aralkyl group, or an alkaryl group. The value of e is 0.1-0.6. The value of f is 0-0.3. The value of g is 0.3-0.8. The value of h is 0 to 0.3. Preferably, e is 0.2-0.4, f is 0 to 0.2, g is 0.5-0.8, and h is 0. The sum of e, f, g, and h, is one. The composition of an average resin molecule contains more than two anhydride groups. Preferably, the equivalent weight of anhydride groups per anhydride functional silicone resin is 100-1,000, more preferably 200-800.

Representative of a suitable anhydride group, and the preferred anhydride group is the tetra-hydrophthalic anhydride group shown below.

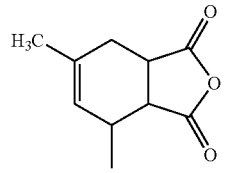

Suitable alkyl groups include methyl, ethyl, propyl, butyl, and octyl groups. A suitable aryl group is phenyl. The aralkyl group can include benzyl, phenylethyl, and 2-phenylpropyl. The alkaryl group can be tolyl or xylyl.

Anhydride functional silicone resins and methods of making the resins, as well as the resin used in Example B2, are described in the common assignee's copending U.S. Provisional Application Ser. No. 60/614,249, filed Sep. 29, 2004 which is hereby incorporated by reference. Preferably, anhydride functional silicone resins can be prepared by first preparing a SiH functional resin intermediate. This is followed by hydrosilylation of the SiH functional resin intermediate with 2-methyl-3-butyn-2-ol (HC≡CC(CH_3)_2OH), dehydration to form a diene functionality, and Diels-Alder addition of maleic anhydride.

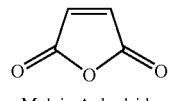

Maleic Anhydride

The reaction is carried out in a solvent such as benzene, toluene, xylene, tetrahydrofuran, diethylether, at a temperature of –50° C. to 100° C. The reaction is carried out typically in 30 minutes to 24 hours, generally in 6-12 hours. The ratio of the amount of maleic anhydride used to the amount of the SiH functional resin intermediate is from 1:0.1 to 1:2.5 on a molar basis, preferably from 1:0.2 to 1:1.5.

Hydrosilylation requires a catalyst to effect reaction between the ≡SiH containing reactant and the reactant containing unsaturation. Suitable catalysts are Group VIII transition metals. Some examples of metal catalysts that can be used are platinum catalysts resulting from reaction of chloroplatinic acid with organosilicon compounds containing terminal aliphatic unsaturation described in U.S. Pat. No. 3,419,593 (Dec. 31, 1968); Karstedt's catalyst described in his U.S. Pat. No. 3,715,334 (Feb. 6, 1973) and U.S. Pat. No. 3,814,730 (Jun. 4, 1974) which is a platinum-vinylsiloxane substantially free of chemically combined halogen; deposited platinum catalysts and complexed platinum catalysts described in U.S. Pat. No. 3,923,705 (Dec. 2, 1975); platinum-organopolysiloxane complexes prepared by reacting platinous halides with organopolysiloxanes having silicon bonded organic groups containing terminal olefinic unsaturation described in U.S. Pat. No. 5,175,325 (Dec. 29, 1992); and platinum supported on active carbon particles.

The Thermal Catalyst

Optional component (c), the thermal catalyst, is illustrated by (i) aliphatic and aromatic tertiary amines such as dimethylpropylamine, pyridine, dimethylaminopyridine, dimethylbenzylamine, and dimethylaminomethyl phenol; (ii) amine salts; (iii) boron trifluoride complexes; (iv) amine borates; (v) latent catalysts such as boron trifluoride, monoethylamine, and dicyandiamide; and (vi) imidazoles such as 2-ethylimidazole, and 2-ethyl-4-methylimidazole available under the trademark IMICURE® EMI-2,4 from Air Products & Chemicals Incorporated, Allentown, Pa. Some examples of other useful thermal catalysts include (vii) Lewis acids and Lewis acid complexes including aluminum trichloride, aluminum tribromide, boron trifluoride, boron trichloride, antimony pentafluoride, titanium tetrafluoride, boron trifluoride and boron trichloride complexes such as $BF_3$, diethylamine, a $BCl_3$ amine complex available under the trademark OMICURE® BC-120 from CVC Specialty Chemicals, Incorporated, Maple Shade, N.J.; (viii) hydrazides such as aminodihydrazide; (ix) guanidines such as tetramethyl guanidine; and (x) dicyandiamide. While compositions containing components (a) and (b) can be cured without a catalyst, the inclusion of a catalyst hastens the cure. The thermal catalyst may be present in the composition in an amount from 0-10 parts by weight based on 100 parts by weight of the glycidyl ether epoxide resin. Preferably, the thermal catalyst may be used in an amount from 0.010-10 parts by weight, more preferably 0.1-5 parts by weight, on the same basis.

The Organic Polyol

The organic polyols, optional component (d), are known compositions that are also described in detail in the '199 patent in Columns 13-19. Some representative organic polyols include polyether polyols such as polyhydroxyalkanes and polyoxyalkylene polyols; the acrylic and vinyl polyols; the polyester polyols; the polycaprolactone polyols; and other lactone polyols such as polyvalerolactone polyols, and polymethylcaprolactone polyols.

Suitable polyether polyols include (a) alkylene oxide adducts of polyhydroxyalkanes; (b) alkylene oxide adducts of non-reducing sugars and sugar derivatives; (c) alkylene oxide adducts of phosphorous and polyphosphorous acids; (d) alkylene oxide adducts of polyphenols; and (e) polyols from natural oils such as castor oil.

The class of organic polyols most preferred for use in coating compositions according to the invention are polycaprolactone polyols, representative of which are a number of commercially available products sold under the trademark TONE™ from The Dow Chemical Company, Midland, Mich. TONE™ 0305 Polyol was used in the examples. It is a low equivalent weight tri-functional liquid polyol for use in coating applications. Reference may be made to the '199 patent for the details of these and other suitable types of organic polyols. The organic polyol may be present in the composition in an amount from 0 to 200 parts by weight based on 100 parts by weight of the glycidyl ether epoxide resin. Preferably, the organic polyol may be used in an amount of about 0.1-200 parts by weight, based on 100 parts by weight of the glycidyl ether epoxide resin, more preferably 50-150 parts by weight on the same basis.

The Organic Anhydride

The organic anhydride, component (d), when present in the thermal curable composition, includes compounds such as maleic anhydride, succinic anhydride, hexahydrophthalic anhydride, tetrahydrophthalic anhydride, dodecylsuccinic anhydride, phthalic anhydride, nadic methyl anhydride, pyromellitic dianhydride, and mixtures thereof. An organic anhydride that is particularly useful in the invention is hexahydrophthalic anhydride that is available from the Buffalo Chemical Color Corporation, Buffalo, N.Y. These organic anhydrides may also be hydrolyzed to yield diacids derived therefrom, and while the diacids are not preferred, they can be useful for making thermal curable compositions according to the invention. The organic anhydride may be present in the composition in an amount from 0 to 200 parts by weight based on 100 parts by weight of the glycidyl ether epoxide resin, Preferably, the organic anhydride may be used in an amount of about 0.1-200 parts by weight, based on 100 parts by weight of the glycidyl ether epoxide resin, more preferably 50-150 parts by weight on the same basis.

The Filler

The filler, optional component (e), when included in the composition, should be a filler that does not adversely affect the bonding characteristics of the thermal curable composition. Some representative examples of suitable fillers include metal carbonates such as calcium carbonate encompassing chalk, calcite, marl, travertine, marble, and limestone; calcium magnesium carbonate; sodium carbonate; magnesium carbonate; silica including amorphous silica, quartz, glass beads, glass bubbles, and glass fibers; silicates including talc, clays such as montmorillonite, feldspar, mica, calcium silicate, calcium metasilicate, sodium aluminosilicate, and sodium silicate; metal sulfates including calcium sulfate, barium sulfate, sodium sulfate, aluminum sodium sulfate, aluminum sulfate; gypsum; vermiculite; wood pulp; aluminum trihydrate; metal oxides including calcium oxide, lime, aluminum oxide, and titanium dioxide; and metal sulfites including calcium sulfite. Most preferred are silica fillers. When the filler is present, the thermal curable composition may include 0.1-80 parts by weight, based on 100 parts by weight of the glycidyl ether epoxide resin.

The compositions of the invention can be used to prepare one-part thin film adhesives and moldable pellets. The compositions can also be used to encapsulate electronic components by transfer molding involving melt processing followed by curing. The glycidyl ether epoxide resin adds toughness and adhesion, whereas the carbinol functional silicone resin and the anhydride functional silicone resin, add water resistance, weatherability, thermal stability, and flexibility, to coatings and adhesives. The coating compositions can be prepared and used in such applications by combining and mixing the components of the composition together, applying the composition to at least one surface of a substrate, and curing or allowing the composition to cure. The compositions can be prepared by simply mixing the appropriate ingredients together. Standard state of the art mixing and application techniques and equipment can be used in the preparation and use of the compositions. For example, an article can be adhered to a substrate by heating the article, applying the composition to at least one surface of the substrate, placing the heated article in contact with the composition, and curing the composition. Similarly, an article can be encapsulated by transfer molding the composition onto the article to be encap-

EXAMPLES

The following examples are set forth in order to illustrate the invention in more detail.

Example A1

Preparation of SiH Functional Silicone Resin Intermediate A 59.7 gram of phenyltrimethoxysilane and 204 gram of methyltrimethoxysilane were catalyzed by 0.19 gram of trifluoromethane sulfonic acid (TFMSA), and then hydrolyzed with 37.9 gram of deionized water. This was followed by distillation and removal of the by-product methanol. 88.7 gram of 1,1,3,3-tetramethyl-1,3-disiloxane (TMDS) and 39.6 gram of acetic acid were added. The mixture was heated to 50° C. for three hours. Methanol and methyl acetate were removed by distillation. 228.1 gram of toluene was added, and the mixture was washed with (i) saturated aqueous sodium bicarbonate and (ii) multiple aliquots of deionized water. The mixture was then filtered, and dried of water via azeotropic distillation. A solution of 431.6 gram was recovered. It contained a composition having a structure corresponding to the formula $M^H_{0.4}T^{Me}_{0.5}T^{Ph}_{0.1}$, wherein $M^H$ denotes $H(CH_3)_2SiO_{1/2}$, $T^{Me}$ denotes $CH_3SiO_{3/2}$, and $T^{Ph}$ denotes $C_6H_5SiO_{3/2}$.

Example A2

Preparation of Carbinol Functional Silicone Resin 431.6 gram of the SiH functional silicone resin intermediate A prepared in Example A1 was heated to 70-95° C. 0.9 gram of 1 percent by weight platinum on $Al_2O_3$ hydrosilylation catalyst was added, followed by the addition of 209.1 gram of allyl alcohol. The mixture was heated at 70-110° C. until the SiH was consumed. This was determined by following the disappearance of the SiH peak in the FTIR spectrum that typically occurs about 2165 cm$^{-1}$. 0.04 gram of triphenylphosphine and 0.75 gram of carbon black were added. The product mixture was filtered, and the solvent was removed. 260.5 gram of a carbinol functional silicone resin was recovered having a composition as determined by $^{29}Si$ NMR to be $M^{PrOH}_{0.361}T^{Me}_{0.517}T^{Ph}_{0.101}$ where $M^{PrOH}$ denotes $(HO(CH_2)_3)(CH_3)_2SiO_{1/2}$, $T^{Ph}$ denotes $C_6H_5SiO_{3/2}$, and $T^{Me}$ denotes $CH_3SiO_{3/2}$.

Example B1

Preparation of SiH Functional Silicone Resin Intermediate B

Methyltrimethoxysilane $CH_3Si(OCH_3)_3$ (4,958.4 gram) was hydrolyzed with deionized water (252.3 gram) in the presence of trifluoromethane sulfonic acid (4.93 gram). 1,1, 3,3-tetramethyl-1,3-disiloxane (TMDS) (5,456.4 gram) and additional deionized water (725.8 gram) were added. The volatile content was removed by distillation, and then the product mixture was dissolved in hexane (2,210 gram). The product solution was washed with saturated aqueous sodium bicarbonate, and multiple aliquots of deionized water. It was then dried over magnesium sulfate, filtered, and any remaining solvent was removed. The product had a $^{29}Si$ NMR determined composition of $M^H_{0.54}D^{Me2}_{0.03}T^{Me}_{0.43}$ where $M^H$ is $H(CH_3)_2SiO_{1/2}$, $D^{Me}_2$ is $(CH_3)_2SiO_{2/2}$, and $T^{Me}$ is $CH_3SiO_{3/2}$.

Example B2

Preparation of Anhydride Functional Silicone Resin 2

A mixture of 2-methyl-3-butyn-2-ol (200.35 gram) and 0.51 gram of a toluene solution containing 0.481 percent by weight of platinum as a divinyltetramethyldisiloxane complex was heated to 95° C. 200.17 gram of the SiH functional silicone resin intermediate B of Example B1 was dissolved in xylene (86.04 gram), and added to the solution drop wise. After heating the mixture at 90-100° C. for 8.5 hours, the solvent was removed under vacuum. The product was dissolved in xylene (300.0 gram), and potassium hydrogen sulfate (4.01 gram) added. The mixture was heated to remove water as an azeotrope, by holding the reflux temperature for eighteen hours. Maleic anhydride (313.1 gram) was added, and the mixture was heated to reflux for 48 hours. The solvent was removed under vacuum. The product was re-dissolved in toluene (491.4 gram) and filtered. The toluene was stripped yielding 415.5 gram of a viscous amber liquid. The liquid product had a $^{29}Si$ NMR spectrum containing major peaks centered at chemical shifts (relative to 0 ppm for tetramethylsilane) of 7 ppm (0.21 mol fraction, $M^R$), $-20$ ppm (0.29 mol fraction $(CH_3)_2SiO_{2/2}$), and $-66$ ppm (0.40 mol fraction, $(CH_3SiO_{3/2})$. The unit $M^R$ was tetrahydrophthalic anhydride, shown in more detail below.

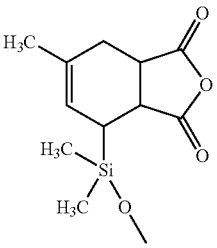

Example 1

Carbinol Functional Silicone Resin/Glycidyl Ether Epoxide Resin Pellet 5.1 gram of the solid carbinol functional siloxane resin prepared in Example A2, was heated in a laboratory oven to 160° C. in a glass vial to provide a flowable liquid. The liquid was transferred to a 100° C. oven. 1.3 gram of D.E.R® 331 glycidyl ether epoxide resin was preconditioned to 100° C., and added to the carbinol functional silicone resin. The mixture was mixed aggressively with a wooden spatula. The mixture was poured immediately into a 3-millimeter diameter cylindrical polypropylene mold, and cooled in a freezer in order to solidify it rapidly. A razor blade was used to slit open the polypropylene mold, the carbinol functional silicone resin/glycidyl ether epoxide resin rod was released, and then the rod was cut into 5-millimeter long pellets.

One pellet was placed between two 8-millimeter parallel plates. The plates were heated to 70° C. to allow the material to be squeezed between the two plates and trimmed on a Rheometrics RDA2 rheometer. The material was cooled to room temperature before measuring its viscosity as a function of temperature in order to evaluate its melt and cure properties. The melt and cure properties were determined by means of a melt and cure profile for a composition containing the carbinol functional silicone resin and the D.E.R.® 331 Epoxy Resin. The melt and cure profile showed that the solid pellet had softened to a liquid having a viscosity of about 2 Pa·s before the cure reaction had begun, and that it had irreversibly crosslinked the composition at a temperature above 120° C. This type of melt and cure profile is typical for materials used in transfer molding applications in the electronics industry.

Example 2

Carbinol Silicone Resin/Glycidyl Ether Epoxide Resin Thin Film Adhesive

Three of the pellets prepared in Example 1 were placed in a 2"×3" 40-mil thick Teflon® lined steel chase mold, and placed in a Carver hot press under 10,000 pounds of pressure at 135° C. for 2 minutes. After removing the mold from the press, a laminate of 40-mil thick carbinol functional silicone resin/glycidyl ether epoxide resin material was sandwiched between two Teflon® release sheets. A 0.5-inch strip was cut from the laminate, and the release liner was removed from one side to expose the adhesive material.

The adhesive material was pressed onto a steel panel, and the other side of the release liner was removed successfully. This transferred the adhesive film to the steel panel. A small 0.5-ounce glass vial was heated in an oven to 110° C., and the bottom of the hot vial was pressed onto the adhesive film. It formed a good bond to the vial bottom and was completely wetted. The bond was cured at 150° C. overnight in order to completely cure the composition. It formed a good structural bond with the vial. This example demonstrates that the composition is suitable for use as a thin film adhesive for electronics applications, especially in applications where hot chips are adhered to metallic substrates.

Example 3

Anhydride Functional Silicone Resin/Glycidyl Ether Epoxide Resin Thin Film Adhesive Without a Thermal Catalyst The anhydride functional silicone resin prepared in Example B2, and a multi-functional epoxy resin 1,1,1-tris-(p-Hydroxyphenyl)ethane Glycidyl Eether (THPE-GE) from CVC Specialty Chemicals, Incorporated, Maple Shade, N.J., were warmed in an oven at 80° C. to render them readily flowable liquids. Two parts of the anhydride functional silicone resin were mixed with one part of the epoxy resin, and the mixture was poured in a 2"×3", 40-mil thick Teflon® lined steel chase mold, and placed in a Carver hot press under 10,000 pounds of pressure, at 100° C. for two minutes. After removing the mold from the press, a laminate of 40-mil thick anhydride functional silicone resin/glycidyl ether epoxide resin material was sandwiched between two Teflon® release sheets. A 0.5-inch strip was cut from the laminate, and the release liner was removed from one side to expose the adhesive material.

The adhesive material was pressed onto a clean, 4 inch silicon wafer, and the other side of the release liner was removed successfully. This transferred the adhesive film to the silicon wafer. A small 0.5-ounce glass vial was heated in an oven to 85° C., and the bottom of the hot vial was pressed onto the adhesive film. It formed a good bond to the vial bottom and was completely wetted. The bond was cured at 150° C. for one hour followed by 200° C. for one hour to completely cure the composition and then cooled slowly to room temperature. The thin film adhesive formed a good structural bond between the silicon wafer and the vial. This example demonstrates that the composition is suitable for use as a thin film adhesive for electronics applications, especially in applications where chips are adhered to metallic substrates at elevated temperatures.

Example 4

Anhydride Functional Silicone Resin/Glycidyl Ether Epoxide Resin Thin Film Adhesive With an Imidazole Thermal Catalyst A thin film adhesive transfer film was prepared in the same way as described in Example 3, except that one drop of a 25 percent ethanol solution of 2-ethyl-4-methyl imidazole was added to the mixture, prior to pressing between the Teflon films at 60° C. A 0.5-inch strip was cut from the laminate, and the release liner was removed from one side to expose the adhesive material. The adhesive material was pressed onto a clean, 4 inch silicon wafer, and the other side of the release liner was removed successfully. This transferred the adhesive film to the silicon wafer. A small 0.5-ounce glass vial was heated in an oven to 85° C., and the bottom of the hot vial was pressed onto the adhesive film. It formed a good bond to the vial bottom and was completely wetted. The bond was cured at 150° C. for one hour to completely cure the composition and then cooled slowly to room temperature. The thin film adhesive formed a good structural bond with the vial. This example demonstrates that the composition is suitable for use as a thin film adhesive, and that the cure can be accelerated by the use of an imidazole or similar catalyst.

Some benefits of the composition are that it is a solid at ambient and storage temperatures. This provides for easy handling and positioning. It is also melt flowable at temperatures less than 150° C. prior to cure. This results in the composition being moldable and capable of making good contact with substrates when applied as an adhesive.

Other variations may be made in compounds, compositions, and methods described herein without departing from the essential features of the invention. The embodiments of the invention specifically illustrated herein are exemplary only, and not intended as limitations on their scope except as defined in the appended claims.

The invention claimed is:

1. A thermal curable composition comprising:
(a) 100 parts by weight of a glycidyl ether epoxide resin;
(b) 50-300 parts by weight of a carbinol functional silicone resin or a mixture of a carbinol functional silicone resin and an anhydride functional silicone resin, wherein the carbinol functional silicone resin has a carbinol equivalent weight of 100-1000, and contains the units:

$(R^1_3SiO_{1/2})_a$
$(R^2_2SiO_{2/2})_b$
$(R^3SiO_{3/2})_c$ and
$(SiO_{4/2})_d$, wherein $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms; $R^3$ is an alkyl group having 1-8 carbon atoms or an aryl group; a has a value of less than or equal to 0.5; b has a value of less than or equal to 0.3, c has a value of 0.3-0.8; d has a value of less than 0.5; and the value of a+b+c+d=1; there being on average, at least one carbinol group per carbinol functional silicone resin molecule; and greater than 10 percent by weight of the $R^1+R^2+R^3$ groups are phenyl groups; and optionally (c) 0-10 parts by weight of a thermal catalyst.

2. A thermal curable composition comprising:

(a) 100 parts by weight of a glycidyl ether epoxide resin or its hydrogenated forms;

(b) 50-300 parts by weight of a carbinol functional silicone resin or a mixture of a carbinol functional silicone resin and an anhydride functional silicone resin, wherein the carbinol functional silicone resin has a carbinol equivalent weight of 100-1000, and contains the units:

$(R^1_3SiO_{1/2})_a$
$(R^2_2SiO_{2/2})_b$
$(R^3SiO_{3/2})_c$ and
$(SiO_{4/2})_d$, wherein $R^1$ and $R^2$ are each independently a hydrogen atom, an alkyl group having 1-8 carbon atoms, an aryl group, a carbinol group free of aryl groups having at least 3 carbon atoms, or an aryl-containing carbinol group having at least 6 carbon atoms; $R^3$ is an alkyl group having 1-8 carbon atoms or an aryl group; a has a value of less than or equal to 0.5; b has a value of less than or equal to 0.3, c has a value of 0.3-0.8; d has a value of less than 0.5; and the value of a+b+c+d=1; there being on average, at least one carbinol group per carbinol functional silicone resin molecule; and greater than 10 percent by weight of the $R^1+R^2+R^3$ groups are phenyl groups; and (c) 0.01 - 10 parts by weight of a thermal catalyst.

3. A composition according to claim 1
with the further proviso that the composition is a solid at ambient and storage temperatures, and that it is melt flowable at temperatures of less than 150° C.

4. A composition according to claim 1 in which the carbinol functional silicone resin contains units selected from the group consisting of:

I. the units:
$((CH_3)_3SiO_{1/2})_a$
$((R^2)CH_3SiO_{2/2})_b$ where $R^2$ is —$(CH_2)_3C_6H_4OH$
$((C_6H_5)CH_3SiO_{2/2})_b$ and
$(C_6H_5SiO_{3/2})_c$, II. the units:
$((R^1)(CH_3)_2SiO_{1/2})_a$ where $R^1$ is —$(CH_2)_3C_6H_4OH$ and
$(C_6H_5SiO_{3/2})_c$, III. the units:
$((R^1)(CH_3)_2SiO_{1/2})_a$ where $R^1$ is —$(CH_2)_3OH$ and
$(C_6H_5SiO_{3/2})_c$, IV. the units:
$((R^1)(CH_3)_2SiO_{1/2})_a$ where $R^1$ is —$(CH_2)_3OH$
$(CH_3SiO_{3/2})_c$ and
$(C_6H_5SiO_{3/2})_c$, V. the units:
$((CH_3)_3SiO_{1/2})_a$
$((R^2)CH_3SiO_{2/2})_b$ where $R^2$ is —$(CH_2)_3OH$
$((C_6H_5)CH_3SiO_{2/2})_b$ and
$(C_6H_5SiO_{3/2})_c$, VI. the units:
$((CH_3)_3SiO_{1/2})_a$
$((R^1)(CH_3)_2SiO_{1/2})_a$ where $R^1$ is —$(CH_2)_3OH$ and
$(C_6H_5SiO_{3/2})_c$, and VII. the units:
$((R^1)(CH_3)_2SiO_{1/2})_a$ where $R^1$ is —$CH_2CH(CH_3)CH_2OH$
$((H)(CH_3)_2SiO_{1/2})_a$ and
$(C_6H_5SiO_{3/2})_c$.

where a has a total value in the resin of 0.2-0.4; b has a total value in the resin of zero to 0.3; and c has a total value in the resin of 0.3-0.8.

5. A composition according to claim 1 wherein the anhydride functional silicone resin contains the units:

(i) $(R^4_3SiO_{1/2})_e$
(ii) $(R^5_2SiO_{2/2})_f$
(iii) $(R^6SiO_{3/2})_g$ and
(iv) $(SiO_{4/2})_h$ where $R^4$, $R^5$, and $R^6$ are each independently an anhydride group, a hydrogen atom, an alkyl group having 1-8 carbon atoms, an aryl group, an aralkyl group, or an alkaryl group; e has a value of 0.1-0.6; f has a value of zero to 0.3; g has a value of 0.3-0.8; h has a value of zero to 0.3; and the sum of e, f, g, and h is one; with the provisos that the composition contains on average more than two anhydride groups per average molecule, and that the composition is a solid at ambient and storage temperatures and is melt flowable at temperatures of less than 150° C.

6. A composition according to claim 1 wherein the anhydride functional silicone resin comprises only $(R^4_3SiO_{1/2})_e$ and $(R^6SiO_{3/2})_g$ units where $R^4$ and $R^6$ are each independently an anhydride group, a hydrogen atom, an alkyl group having 1-8 carbon atoms, an aryl group, an aralkyl group, or an alkaryl group; e has a value of 0.1-0.6 and g has a value of 0.3-0.8.

7. A composition according to claim 1 wherein component (b) is a carbinol functional silicone resin.

8. A composition according to claim 5 wherein component (b) is a mixture of a carbinol functional silicone resin and an anhydride functional silicone resin.

9. A composition according to claim 1 in which the epoxide resin (a) is selected from the group consisting of diglycidyl ethers of bisphenol A derived from reacting bisphenol A with epichlorohydrin; glycidyl ethers of bisphenol A derived from reacting bisphenol A with an alcohol and epichlorohydrin; aryl glycidyl ether epoxide resins; polynuclear phenol glycidyl ether epoxide resins; aryl glycidyl ether epoxide resins; di-nuclear aryl glycidyl ether epoxide resins; multi-nuclear aryl glycidyl ether epoxide resins; cresol-novolac glycidyl ether epoxide resins; and phenol-novolac glycidyl ether epoxide resins.

10. A composition according to claim 1 in which the catalyst (c) is selected from the group consisting of (i) aliphatic and aromatic tertiary amines; (ii) amine salts;
(iii) boron trifluoride complexes; (iv) amine borates; (v) boron trifluoride; (vi) imidazoles; (vii) Lewis acids and Lewis acid complexes; (viii) hydrazides; and (ix) guanidines.

11. A composition according to claim 1 further comprising (d) 0.1-200 parts by weight of an organic polyol, an organic anhydride, or a mixture thereof.

12. A composition according to claim 1 further comprising (d) 0.1-200 parts by weight of an organic polyol selected from the group consisting of polyhydroxyalkane polyols, polyoxyalkylene polyols, acrylic polyols, vinyl polyols, polyester polyols, and polycaprolactone polyols; or (d) 0.1-200 parts by weight of an organic anhydride selected from the group consisting of maleic anhydride, succinic anhydride, hexahydrophthalic anhydride, tetrahydrophthalic anhydride, dodecylsuccinic anhydride, phthalic anhydride, nadic methyl anhydride, pyromellitic dianhydride, and mixtures thereof.

13. A composition according to claim 1 further comprising (e) 0.1-80 parts by weight of a filler selected from the group consisting of metal carbonates; silica; silicates; gypsum; vermiculite; wood pulp; aluminum trihydrate; metal oxides; and metal sulfites.

14. A composition according to claim 1 wherein the ratio of carbinol and anhydride groups to epoxide groups is 0.5 to 1.2.

15. A method of adhering an article to a substrate comprising heating the article, applying to at least one surface of the substrate, the composition according to claim 1, placing the heated article in contact with the composition, and curing the composition.

16. A method of encapsulating an article comprising transfer molding the composition according to claim 1 onto an article, by exposing the article to heat, causing the composition to flow and cure.

17. A method of adhering an article to a substrate comprising heating the article, applying to at least one surface of the substrate, the composition according to claim 4, placing the heated article in contact with the composition, and curing the composition.

18. A method of adhering an article to a substrate comprising heating the article, applying to at least one surface of the substrate, the composition according to claim 7, placing the heated article in contact with the composition, and curing the composition.

19. A method of encapsulating an article comprising transfer molding the composition according to claim 4 onto an article, by exposing the article to heat, causing the composition to flow and cure.

20. A method of encapsulating an article comprising transfer molding the composition according to claim 7 onto an article, by exposing the article to heat, causing the composition to flow and cure.

* * * * *